Patented Aug. 4, 1953

2,647,841

UNITED STATES PATENT OFFICE 2,647,841

PREPARATION OF LUMINESCENT SCREENS

Martin L. Perl and John R. Elliott, Schenectady, N. Y., assignors to General Electric Company, a corporation of New York No Drawing. Application August 31, 1950, Serial No. 182,638

9 Claims. (Cl. 117—33.5)

The present invention relates to a method of preparing luminescent screens. More particularly, it is concerned with an improved method of preparing cathode ray screens by liquid settling of the phosphor from a suitable suspension thereof.

In order to obtain a uniform phosphor distribution and good contrast characteristics in luminescent screens such as those used for the conventional cathode ray tubes, the presently accepted method of applying the phosphor material comprises the settling thereof from a suspension in a suitable liquid, such as water, ordinarily containing a binder for the phosphor. In accordance with this process, the bulb container or tube envelope is filled with water or an aqueous solution of a binder to a height of a few inches and the powdered phosphor suspended in an additional amount of water or solution is then rapidly poured into the tube envelope where it settles through or from the suspension on to the tube face. Various silicates have been employed as the binders, and it has also been the practice to add to the silicates certain electrolytes such as sodium sulphate and sodium oxalate for the purpose of increasing the adhesion of the phosphor to the glass comprising the face of the tube.

The time between the addition of the phosphor to the tube and the removal of the liquid from the tube is called the settling time. In accordance with prior practice, this time has ordinarily been at least 30 minutes and may be as high as 2 hours. A reduction in this total settling time is a major problem in the tube industry. Usually the tubes are provided with the luminescent screens while on conveyors and must remain on the conveyors until the liquid is poured off. A long settling time requires long conveyors and results in low production per conveyor. With the presently known liquid settling methods, any attempt at a reduction of the screening time has resulted in a reduced adhesion of the phosphor to the glass with resultant uncoated areas on the screen which destroy its usefulness.

It is an object of the present invention to provide an improved method of depositing or settling a phosphor on a supporting surface.

Another object of the invention is to provide a method of liquid settling a phosphor on a supporting surface which is characterized by a total settling time which is substantially shorter than those necessary with known methods.

A further object of the invention is to provide a method of liquid settling a phosphor on a supporting surface whereby the desired adhesion of the phosphor to that surface can be obtained in a relatively short time.

In the liquid settling of fluorescent or luminescent screens employing a silicate bath, the silicate bath has two functions. One is to distribute the phosphor over the screen in a uniform manner and the other is to produce the proper phosphor adhesion to the glass. The time from the addition of the phosphor to the settling bath to the settling of the phosphor particles on the supporting surface is herein called the distribution or dispersing time. The time elapsing after the particles have settled on to the screen until the silicate bath is poured or syphoned off is called adhesion time. The sum of these two times constitutes the total settling time. Since the distribution time ordinarily is from 8 to 10 minutes while the adhesion time will run from at least 30 minutes to as much as 2 hours, it is clear that any reduction in the adhesion time without sacrificing the screen quality will materially increase the rates of production and hence decrease the cost of manufacturing screens.

The present invention is based primarily on the discovery that the adhesion time and hence the total settling time can be materially reduced by employing a settling bath for the phosphor essentially comprising an alkali silicate solution acidified to have a pH from about 6 to 7.5, preferably from about 6 to 7. As the result of the present invention, total settling time as short as 12 minutes can readily be obtained. As this total time includes the distribution or dispersing time, it can readily be seen that there has been provided a liquid settling method which permits the saving of at least 50% and generally more than 60% of the total time necessary for the screening operation. While the invention will be particularly described with reference to the screening of a cathode ray tube, it is to be understood that it is equally applicable to the coating of any suitable supporting surface with a phosphor.

While a number of variations are possible in the method of the present invention, each of them is characterized by the use of an acidified silicate bath having a pH of from 6 to 7.5. The invention is not limited to any particular phosphor and any finely divided phosphor material which does not react with the ingredients of the bath can be employed. In general, this includes all of the phosphors presently used with silica sols in the preparation of luminescent screens. Furthermore, while the concentrations of the baths and the temperatures thereof are interrelated, wide variations in the method of the present invention are possible with regard to these factors provided the relative proportions of silicate and acidifying agent are such as to maintain in the baths the required hydrogen ion concentrations.

Ordinarily, the bath is acidified by means of an acid which is sufficiently strong to lower the pH of the silicate below 7.5 and preferably below 7 but which does not precipitate silicate immediately. Tubes have been successfully screened using baths acidified with phosphoric acid, sulphuric acid, acetic, oxalic and hydrochloric acids or with various acid salts such as sodium hydrogen sulphate and sodium dihydrogen phosphate. Phosphoric acid is ordinarily preferred as the use of this acid permits greater production variations in the amounts of acid and silicate without departure from the pH range of 6 to 7.5. Both potassium and sodium silicates have been successfully employed with any of the acids although potassium silicates are preferred because of their shorter gelation times.

Provided the silicate and acid or acidifying agent are employed in proportion such that the pH of the final solution or sol is 6 to 7.5 and preferably about 6.5, any of a number of procedures can be employed in carrying out the settling process. Generically, these processes comprise placing in the tube a cushion consisting of water, a water solution of the acid or acidifying agent or the silicate or the silica sol produced by mixing them. The phosphor is suspended in water which may also contain some or all of the acid or acidifying agent or the silicate or the silica sol formed by mixing the two. The phosphor suspension is added to the tube either prior to, during or after formation of the silica sol bath in the cushioning layer. The phosphor settles through the resultant bath having the desired pH on to the tube face. After a time depending on the silicate concentration and temperature, as will be explained more fully hereinafter, the tube is inverted so that the liquid pours off leaving the phosphor adhering to the tube face. The water or solution is allowed to drain out of the tube completely and then the screen is dried by blowing air into the tube and the tube processed in accordance with the known methods for making cathode ray tubes.

In order that those skilled in the art may more fully understand how the present invention is carried into effect, the following specific examples are given.

EXAMPLE 1

A preferred procedure from the standpoint of simplicity and flexibility of the time schedule and one which produces screens of good and equal quality is as follows. A solution of 105 c.c. of 12.3% phosphoric acid is mixed with 2100 c.c. of water and this solution placed in a 10" cathode ray tube. A mixture of 350 c.c. of water and 100 c.c. of a commercial potassium silicate solution containing 27.2%, by weight, of potassium silicate with a silica-to-potassium oxide molecular ratio of 3.9, is made up, and the phosphor is suspended therein. The suspension is then poured into a tube at a temperature of about 75° to 90° F. After a suitable time interval depending upon the temperature and which is about 12 minutes at 77–80° F., the remaining liquid is poured from the tube and the tube processed in the usual manner.

EXAMPLE 2

By using a more dilute sol in the process of Example 1 which is done by employing 85 c.c. of dilute phosphoric acid in place of the 105 c.c. and 80 c.c. of the silicate solution instead of 100 c.c., the optimum total settling time is increased to about 30 minutes at room temperature (77–80° F.).

EXAMPLE 3

A potassium silicate solution is made by diluting the commercial silicate employed in Example 1 with an equal volume of water. The phosphoric acid solution is made up by placing 1500 c.c. of water in a container and adding thereto 200 c.c. of 85% orthophosphoric acid. An additional 500 c.c. of water is then added and the mixture shaken carefully. When this procedure is employed for screening two tubes, a mixture of 210 c.c. of the phosphoric acid solution and 4600 c.c. of water is mixed with 400 c.c. of the diluted potassium silicate and 2200 c.c. of this solution is placed in each tube.

Suitable quantities of the phosphor material are weighed up in two batches and to each batch is added one-half of the remaining acid-silicate solution, making a total of about 400 c.c. in each mixture. The phosphor suspensions are added to each tube and the tubes allowed to stand at a temperature of 77 to 80 degrees F. for about 12 minutes. The liquid can then be poured off in about one minute and the tube drained and air dried.

A settling time of approximately 12 minutes was also obtained when 232 c.c. of sulphuric acid of 8.43% concentration was substituted for the 200 c.c. of diluted phosphoric acid employed in the above example.

It has previously been indicated that there is a relationship between temperature and concentration of the solution and either one may be varied to compensate for the other. For a constant silicate concentration, the temperature of the bath when increased results in a decrease of the minimum adhesion time. On the other hand, if the minimum adhesion time is to be kept constant, the silicate concentrations must be correspondingly decreased. Experiments on temperature and concentration variations were performed by keeping the settling time constant at 12 minutes. It was found that if the temperature for a suitable bath is increased above 80° F., the gelation time of the whole bath is reduced and the bath becomes unduly viscous before pour-off. On the other hand, if the temperature is decreased below 77° F., the rate of silicate film gelation is too slow and the phosphor does not adhere well to the glass during the pour-off. For a constant silicate concentration, which term is intended to include both the silicate and the acidifying ingredient in amounts giving a resultant pH of 6 to 7.5, the temperature can be varied within a 3 or 4 degree range without affecting the screen quality. However, ambient temperature conditions can be compensated for by silicate concentration change as shown in the following table, giving the proportions of ingredients employed for a specific temperature range to obtain an average settling time of 12 minutes with solutions of a pH of 6.5.

*Table 1*

| Temperature Range °F. | Cut Potassium Silicate [1] | Volume in cc. | |
|---|---|---|---|
| | | 12.3% $H_3PO_4$ | Total Water |
| 68–73 | 240 | 127 | 2,250 |
| 73–77 | 220 | 115 | 2,275 |
| 77–80 | 200 | 105 | 2,300 |
| 80–84 | 180 | 95 | 2,325 |
| 84–88 | 160 | 83 | 2,350 |

[1] The cut potassium silicate was the commercial potassium silicate of Example 1 diluted with an equal volume of water.

For constant or average settling time of 12 minutes and at a constant temperature, the concentration of the bath can be varied plus or minus 5% without affecting the process, that is, without resulting in too great a viscosity prior to pour-off or in too slow an adhesion rate. In general, in order to keep the settling time from exceeding above 30 minutes at temperatures not above about 100° F., the total solutions should be of a concentration such that the $SiO_2$ is present in amounts ranging from about 0.3 to 1.0% by weight based on the weight of the total solution.

When carrying out the present invention in accordance with any of the various procedures, the proportion of water placed in the tube as the cushioning layer with the acid should comprise at least 80% of the total water employed in the process regardless of whether some or all of the acidifying agent, silicate or sol are also present in this layer.

The process of Examples 1 and 2 has the advantage over that of Example 3 in that the operator need not work as fast in order to add the phosphor suspension to the tube prior to gelation of the sol, which gelation reaction begins as soon as the acid and silicate are mixed. Ordinarily in the process of Example 3 the phosphor suspension should be added within 5 minutes of the time the acid-silicate sol is prepared.

Alternative procedures include making the silica sol of all of the acid and all of the silicate in at least 80% of the total water, adding this to the tube as a cushioning layer and thereafter adding the phosphor as a suspension in the remaining water. This process, like that of Example 3, also requires the addition of the phosphor within a short time after the silica sol is prepared and introduced into the tube. Still another procedure which can be successfully employed with phosphors which are not decomposed by acid comprises adding at least 80% of water and all of the silicate to the tube as a cushioning layer and thereafter adding a suspension of the phosphor in the remaining water and all of the acid.

While in the specific examples potassium silicate was employed, satisfactory luminescent screens have also been obtained with sodium silicate, although in general the substitution of the sodium silicate will result in a somewhat longer total settling time due to the slower rate of gelation of this material. It is understood, of course, that the relative amounts of acid and silicate will depend upon the total alkalinity of the silicate and the relative strength of the acid. Likewise, the proportions of water and silicate and acid can also be varied in the manner well known in the art so long as there is sufficient water present to prevent actual gelation of the silica sol during the time it is in the tube and provided further that the solution or sol is sufficiently concentrated to bond the phosphor to the surface of the tube so that the phosphor film will not be disturbed during the pour-off. For any given constant silicate concentration and temperature the process of the present invention offers the additional advantage of permitting a total settling time which can be varied as much as a plus or minus 20% from the ideal settling time. The pour-off time can be decreased to below 1 minute in those cases where the pouring is carried out with a minimum vibration of the tube.

While the invention has been specifically described with reference to a 12-minute settling time, it is to be understood that it is not limited to this particular period. In some cases it may be found desirable to employ a longer settling time of up to 30 minutes to permit greater allowable variations in temperature and concentration of the bath.

What we claim as new and desire to secure by Letters Patent of the United States is:

1. The method of settling a phosphor onto the face of a cathode ray tube which comprises the steps of introducing into said tube a cushioning layer comprising a dilute solution of a strong acid in an amount sufficient to cover the entire face of said tube and thereafter adding to the cushioning layer a silica sol composed of an alkali silicate and water and having a phosphor suspended therein, the $SiO_2$ content of the resultant mixture being from 0.3 to 1.0 per cent, by weight, based on the weight of the resultant mixture, said acid and said silicate being present in proportions such that the pH of the resultant mixture is from 6 to 7.5 maintaining the temperature of the resultant mixture from about 68° to about 100° F. for a period sufficient to allow the phosphor to settle onto and adhere to said face, and thereafter draining said tube of any remaining supernatant liquid and drying the settled phosphor.

2. The process of settling a phosphor screen onto the face of a cathode ray tube which comprises forming a dilute silica sol comprising water and alkali silicate and a strong acid in proportion such that the pH of the sol is from 6 to 7.5, introducing a major portion of said sol into the cathode ray tube to provide a cushioning layer of sol covering the face of said tube, forming a suspension of a phosphor in the remaining portion of said sol and thereafter adding said suspension to the solution contained in said tube the $SiO_2$ concentration of said solution being from 0.3 to 1.0 per cent, by weight, based on the weight of the total solution, maintaining the solution temperature from about 68° to about 100° F. for a period permitting the suspended phosphor to settle onto and adhere to said face, and thereafter removing the solution from said tube and drying the phosphor screen.

3. The method of forming a luminescent screen on the face of the cathode ray tube which comprises covering the said face with a silica sol composed of water, alkali silicate and a strong acid having a pH from 6 to 7.5 and thereafter adding thereto a suspension of a phosphor in water the resulting total solution having an $SiO_2$ concentration of from 0.3 to 1.0 per cent, by weight, based on the weight of the total solution, maintaining the temperature from about 68° to 100° F. while allowing the suspended phosphor to settle onto and adhere to the said face and thereafter draining the said tube and drying the settled phosphor.

4. The method of settling the luminescent screen onto the face of the cathode ray tube which comprises covering the face of said tube with a cushioning layer comprising a dilute solution of an alkali silicate and thereafter adding to said cushioning layer a suspension of a phosphor in a dilute solution of a strong acid, the $SiO_2$ concentration of the resultant mixture being from 0.3 to 1.0 per cent, by weight, based on the weight of said resultant mixture, the amount of acid being that necessary to bring the pH of the resultant mixture to a value of from 6 to 7.5 maintaining the temperature of the resultant mixture from about 68° to about 100° F. while allowing the phosphor particles suspended therein to settle onto and adhere to said face, thereafter draining the remaining liquid from the said tube and drying the adhered phosphor particles.

5. The method of settling a phosphor screen on to the face of a cathode ray tube which comprises introducing into said tube a settling bath composed of an aqueous cushioning layer in an amount sufficient to cover the entire face of said tube and an aqueous suspension of a phosphor, said cushioning layer being introduced into said tube before addition of said suspension of the phosphor, said settling bath consisting of a dilute acidified solution of an alkali silicate having a pH of from 6 to 7.5 and having an $SiO_2$ concentration of from 0.3 to 1.0 percent, by weight, based on the weight of the total solution maintaining the temperature of said total solution from about 68° to 88° F. while allowing the suspended phosphor particles to settle onto and adhere to said face, thereafter draining the remaining solution from the said tube and drying the resultant phosphor screen.

6. The method of providing a luminescent screen on the face of a cathode ray tube which comprises settling a phosphor onto said face from a suspension thereof in a settling bath consisting of a dilute acidified alkali silicate solution having a pH of from 6 to 7.5 and an $SiO_2$ concentration of from 0.3 to 1.0 percent, by weight, based on the weight of the settling bath, said settling bath being composed of a cushioning layer which is first introduced into the tube in an amount sufficient to cover the entire face of said tube and a suspension of said phosphor in the remaining portion of said settling bath subsequently added to said cushioning layer adjusting the temperature of said settling bath from about 68° to 100° F. for a time sufficient to allow the suspended phosphor to settle onto and adhere to said face, thereafter draining remaining liquid from the tube and drying the resultant phosphor luminescent screen.

7. The method of providing a luminescent screen on the face of a cathode ray tube which comprises introducing into said tube an aqueous cushioning layer in an amount sufficient to cover the entire face of said tube and thereafter adding to said cushioning layer and aqueous suspension of a phosphor, said cushioning layer and aqueous suspension together forming a total settling bath containing, in addition to said phosphor, an alkali silicate and a strong acid in such proportions that the pH of the settling bath is from 6 to 7.5 and the $SiO_2$ content is from 0.3 to 1.0 percent, by weight, based on the weight of the settling bath adjusting the temperature of said settling bath from about 68° to 100° F. for a time sufficient to allow the suspended phosphor to settle onto and adhere to said face, thereafter draining remaining liquid from the tube and drying the resultant phosphor luminescent screen.

8. The method of claim 7 in which the strong acid is phosphoric acid.

9. The method of claim 7 in which the strong acid is sulfuric acid.

MARTIN L. PERL.
JOHN R. ELLIOTT.

References Cited in the file of this patent

UNITED STATES PATENTS

| Number | Name | Date |
|---|---|---|
| 2,223,830 | Leverenz | Dec. 3, 1940 |
| 2,412,654 | Sadowsky | Dec. 17, 1946 |
| 2,451,590 | Tidik et al. | Oct. 19, 1948 |

FOREIGN PATENTS

| Number | Country | Date |
|---|---|---|
| 769,275 | France | Aug. 23, 1934 |